United States Patent
Cabrera et al.

[19]

[11] Patent Number: 6,123,359
[45] Date of Patent: Sep. 26, 2000

[54] INFLATOR FOR USE WITH GAS GENERANT COMPOSITIONS CONTAINING GUANIDINES

[75] Inventors: Raul Cabrera, Tampa; Cezary Grzelczyk, Lakeland, both of Fla.

[73] Assignee: Breed Automotive Technology, Inc., Lakeland, Fla.

[21] Appl. No.: 09/122,213

[22] Filed: Jul. 25, 1998

[51] Int. Cl.[7] .......................... B60R 21/26; C06B 31/12
[52] U.S. Cl. .............. 280/741; 149/36; 149/62; 149/76
[58] Field of Search ................. 280/741, 740; 149/36, 62, 76

[56] References Cited

U.S. PATENT DOCUMENTS

| | | | |
|---|---|---|---|
| 3,785,674 | 1/1974 | Poole et al. ............................. | 280/150 |
| 3,904,221 | 9/1975 | Shiki et al. ............................. | 280/736 |
| 3,958,949 | 5/1976 | Plantif et al. ........................... | 23/281 |
| 4,316,874 | 2/1982 | Kasama et al. ........................ | 422/126 |
| 4,561,675 | 12/1985 | Adams et al. .......................... | 280/734 |
| 4,858,951 | 8/1989 | Lenzen ................................... | 280/741 |
| 4,907,819 | 3/1990 | Cuevas .................................. | 280/736 |
| 5,016,914 | 5/1991 | Faigle et al. ........................... | 280/741 |
| 5,104,466 | 4/1992 | Allard et al. ........................... | 149/21 |
| 5,114,179 | 5/1992 | Emery et al. .......................... | 280/741 |
| 5,186,491 | 2/1993 | Yoshida et al. ........................ | 280/741 |
| 5,443,286 | 8/1995 | Cunningham et al. ................. | 280/741 |
| 5,468,016 | 11/1995 | Kobari et al. .......................... | 280/741 |
| 5,470,406 | 11/1995 | Ochi et al. ............................. | 149/35 |
| 5,503,806 | 4/1996 | Fulmer et al. ......................... | 422/164 |
| 5,551,724 | 9/1996 | Armstrong, III et al. ............. | 280/737 |
| 5,609,360 | 3/1997 | Faigle et al. ........................... | 280/740 |
| 5,665,131 | 9/1997 | Hock et al. ............................. | 55/487 |
| 5,739,460 | 4/1998 | Knowlton et al. ..................... | 102/324 |
| 5,756,929 | 5/1998 | Lundstrom et al. ................... | 149/22 |
| 5,765,866 | 6/1998 | Canterberry et al. ................. | 280/741 |
| 5,773,754 | 6/1998 | Yamato ................................... | 149/36 |
| 5,806,888 | 9/1998 | Adamini ................................. | 280/741 |
| 5,861,571 | 1/1999 | Scheffee et al. ....................... | 149/76 |

*Primary Examiner*—Edward A. Miller
*Attorney, Agent, or Firm*—Lonnie R. Drayer; Donald O. Nickey

[57] ABSTRACT

The present invention relates to an inflator for a vehicle airbag employing non-azide gas generants. The invention also relates to a new filter system for airbag inflators. The filter is a metal ribbon coiled within the inflator house. The metal ribbon comprises at least one segment of apertures and a segment of expanded metal.

8 Claims, 2 Drawing Sheets

INFLATOR FOR USE WITH GAS GENERANT COMPOSITIONS CONTAINING GUANIDINES

The present invention relates to an inflator used for inflating an airbag of a vehicle occupant restraint system, and more specifically for an inflator housing for use with gas generant compositions containing guanadines.

BACKGROUND OF THE INVENTION

Automobile airbag systems have been developed to protect vehicle occupants in the event of a crash by rapidly inflating a cushion or bag between a vehicle occupant and the interior of the vehicle. The inflated airbag absorbs the vehicle occupant's energy to provide a gradual, controlled deceleration and provides a cushion to distribute body loads and keep the occupant from impacting the hard surfaces of the vehicle interior.

The use of such protective gas-inflated airbags to cushion vehicle occupants in crash situations is now widely known and well documented. The requirements of a gas generant used in an automobile airbag inflator are very demanding. The gas generant must have a burning rate such that the airbag is inflated rapidly (within approximately 30–100 milliseconds) and the burning rate must not vary over long term storage (aging and/or thermal cycling) or as a result of shock and vibration encountered during the life of the vehicle. The burning rate must also be relatively insensitive to changes in humidity and temperature. When pressed into pellets, wafers, cylinders, discs or whatever shape, the hardness and mechanical strength of the gas generant bodies must be adequate to withstand the conditions to which they will be exposed without any fragmentation or change of exposed surface area. Excessive breakage of the generant bodies will lead to system failure where, for example, an undesirable high pressure condition will be created within the inflator, possibly resulting in catastrophic rupture of the inflator housing.

Much effort has also been expended on the development of inflator housings. The housings are the metal shells in which the gas generants are placed and ignited when an airbag needs to be inflated. This housing is fitted with the airbag and together, they form a critical part of any automobile airbag system. Engineers of automobile airbag systems understand that the design of the inflator housing can influence the performance of the gas generant and the overall protection of the vehicle occupant.

The gas generant must efficiently produce a relatively cool, non-toxic, non-corrosive gas which is easily filtered to remove solid and liquid combustion by-products. This filtering is needed to preclude damage to the inflatable airbag or injury to the occupant of the automobile. These requirements limit the applicability of many otherwise suitable chemical compositions, shapes and configurations from being used in automotive airbag inflators. Gas generants can also be used for fire extinguishing. Recently, a number of companies have begun using the gases produced by solid energetic or pyrotechnique materials for fire extinguishing.

The invention, as it relates to the inflator housing, comprises the use of a metal ribbon with a plurality of apertures and a segment of expanded metal that is rolled into a coil and used as a filter to trap combustion products. The following discussion of the background art will assist the artisan in understanding the advancements that the present invention brings to the industry.

BACKGROUND ART

An aspect of the present invention relates to the use of the disclosed gas generant in an inflator housing that comprises a novel filter system. Filters are placed in the inflator housing to trap molten material produced during the combustion of the gas generant and to cool the exhaust gases. The filter system of the present invention is a metal strip or ribbon with two (2) regions having a plurality of apertures and a region of expanded metal. This metal strip is coiled and placed within the inflator housing between the gas generant and the gas exit portals of the housing. While the placement of a filter within the housing is conventional, the presently disclosed filter system provides unexpectedly improved results at minimal labor and material cost. The following is a brief discussion of conventional approaches to filtering combustion gases.

U.S. Pat. No. 3,785,674 to Poole et al. teaches an inflator housing that provides for the combustion gases to pass through a separating screen and then a steel wool filter and into a secondary reacting chamber which "reacts out" the undesirable combustion products while permitting the free nitrogen to pass therethrough.

U.S. Pat. No. 3,958,949 to Plantif et al. teaches an inflator housing with a combustion chamber laterally surrounded by a cooling chamber. The solid coolant material contained in the cooling chamber consists of potassium perchlorate containing copper chromite as a decomposition catalyst. To prevent solid particles from being expelled from the generator, retaining grids are placed adjacent to the discharge apertures.

U.S. Pat. No. 4,316,874 to Kasama et al. teaches a gas generator utilizing granular silicon carbide as a coolant. The generally cylindrical housing assembly has disposed within it two (2) cylindrically shaped stainless steel wire screens so that the interior of the housing is partitioned into a cylindrical central space and a radially outer annular space. The annular space defined between the two (2) wire screens is filled with granular silicon carbide.

U.S. Pat. No. 4,561,675 to Adams et al., while primarily directed to auto ignition of the gas generant, also discloses an inflator that uses multiple filters and a tortuous gas path to remove particulates and cool the exhaust gas. More specifically, this patent teaches that the gas generant pellets be surrounded by an annular inner screen pack or combustion filter. The inflator also possesses an outer screen pack or filter that desirably includes a coarse layer adjacent the inner surface of the cylindrical housing.

In yet another air bag inflator design, U.S. Pat. No. 4,858,951 to Lenzen teaches an airbag inflator wherein the gas generated by the combustion of the generant flows radially through openings in a rigid cylindrical metal tube which surrounds the gas generant pellets. The gas then flows through a filter which is preferably made of a plurality of layers of wire mesh, steel wool and fiberglass.

A hybrid inflator is taught in U.S. Pat. No. 5,016,914 to Faigle et al. A hybrid inflator uses a gas generant to heat an inert gas stored in a container within the inflator. The separation of solid residue from the generated gas is accomplished in part by a 180° turn at the end of the outer housing. At least some of the relatively large particles are inertially removed from the nitrogen gas stream and impinge and fuse against the doomed surface which is preferably coated with a high temperature grease which helps capture the particles.

Various other inflator configurations and filter systems are disclosed in U.S. Pat. Nos. 5,104,466; 5,114,179; 5,186,491; 5,443,286; 5,468,016; and 5,470,406. Typically, the prior art filters have consisted of wire gauze and/or inorganic fiber. Also disclosed is the winding of stainless steel screens, fine-mesh woven metal wire, close-woven metal wire, etc. in layers to form filters that function to cool the combustion gas and remove the combustion residue or slag. While numerous filter designs are known, the prior art has failed to suggest or disclose a metal filter strip or ribbon that comprises two (2) portions with holes or apertures therethrough and a portion of expanded metal, wherein the metal strip is rolled or coiled to form the filter system.

SUMMARY OF THE INVENTION

One aspect of the present invention is to provide a method for producing an air bag inflator that does not suffer from residual moisture contained within the gas generant pellet or from thermal cycling. More specifically, the invention is directed to the use of a novel guanidine-based gas generant composition. A further aspect of the invention is directed to a novel filter system that is disposed within the inflator housing that efficiently and economically traps slag and particulates while cooling the combustion gases.

An additional aspect of the invention relates to the use of a gas generant containing guanadines in an inflator that comprises a specific filter system. More specifically, there is disclosed an inflator for use in inflating an occupant restraint system in response to a vehicle collision signal comprising:

a) housing means defining at least one discharge port for directing a gaseous flow from said housing means;

b) gas generating means disposed within the said housing means;

c) an ignition unit; and d) a filter means wherein said filter means is disposed between said discharge port and said gas generating means; said filter means comprises a metallic ribbon with at least one segment of apertures and at least one segment of expanded metal configured into a coil.

In a more preferred embodiment of the inflator according to the invention, the gas generating means comprises the gas generant disclosed above. In a further embodiment of the inflator, the metallic ribbon comprises two segments of apertures with a diameter of at least 2 mm separated by the expanded metal segment. The ribbon is made of any type of metal having a melting point above about 1000° C. Representative of such metals are 304 stainless steel, 1018 cold rolled steel, iron and alloys.

It will be understood that the size and configuration of the housing will dictate the length and width of the metallic ribbon. However, installed in a steering wheel inflator, the length of the ribbon can range from 500 to 1000 mm and the width can range from 15–50 mm. The thickness of the metal ribbon can range from 0.1 to 1.0 mm depending on the metal selected. In a preferred embodiment, the metal is cold rolled steel at a thickness of 0.635 mm. A factor when considering metal selection and thickness is the amount of force required to form the ribbon into a coil. The coil is formed using any number of techniques such as wrapping the ribbon around a mandrel.

The metal ribbon preferably comprises a first segment of apertures, which will become the interior of the coil and a second segment of apertures which become the exterior of the coil. Disposed between the segments with apertures is a segment of expanded metal. The expanded metal is prepared by placing small cuts or slices into the metal and then pulling the ends to expand the cuts into diamond shaped openings. The length of the expanded metal segment should be at least equal to the sum of the first and second apertured segments, more preferably at least 1.5 times the combined length of the apertured segments. The coil is formed such that the first segment completes the first coil with the expanded metal segment forming at least the next two coils and then lastly the second apertured segment forms the last turn of the coil. The first apertured segment must have upper and lower holes along the edges of the ribbon while the second apertured segment has holes that are centrally located on the ribbon. This configuration ensures the complete combustion of the propellant load. This configuration of apertures also provides excellent filtration since the gases must take a tortuous path to exit the inflator and was discovered by the inventors after other designs of the ribbon failed to allow for the complete combustion of the generant.

BRIEF DESCRIPTION OF THE DRAWINGS

The features of the invention which are believed to be novel are set forth with particularity in the appended claims. The present invention, both as to its structure and manner of operation, may best be understood by referring to the following detailed description, taken in accordance with the accompanying drawings in which:

BRIEF DETAILED DESCRIPTION OF THE INVENTION

Figure 1:
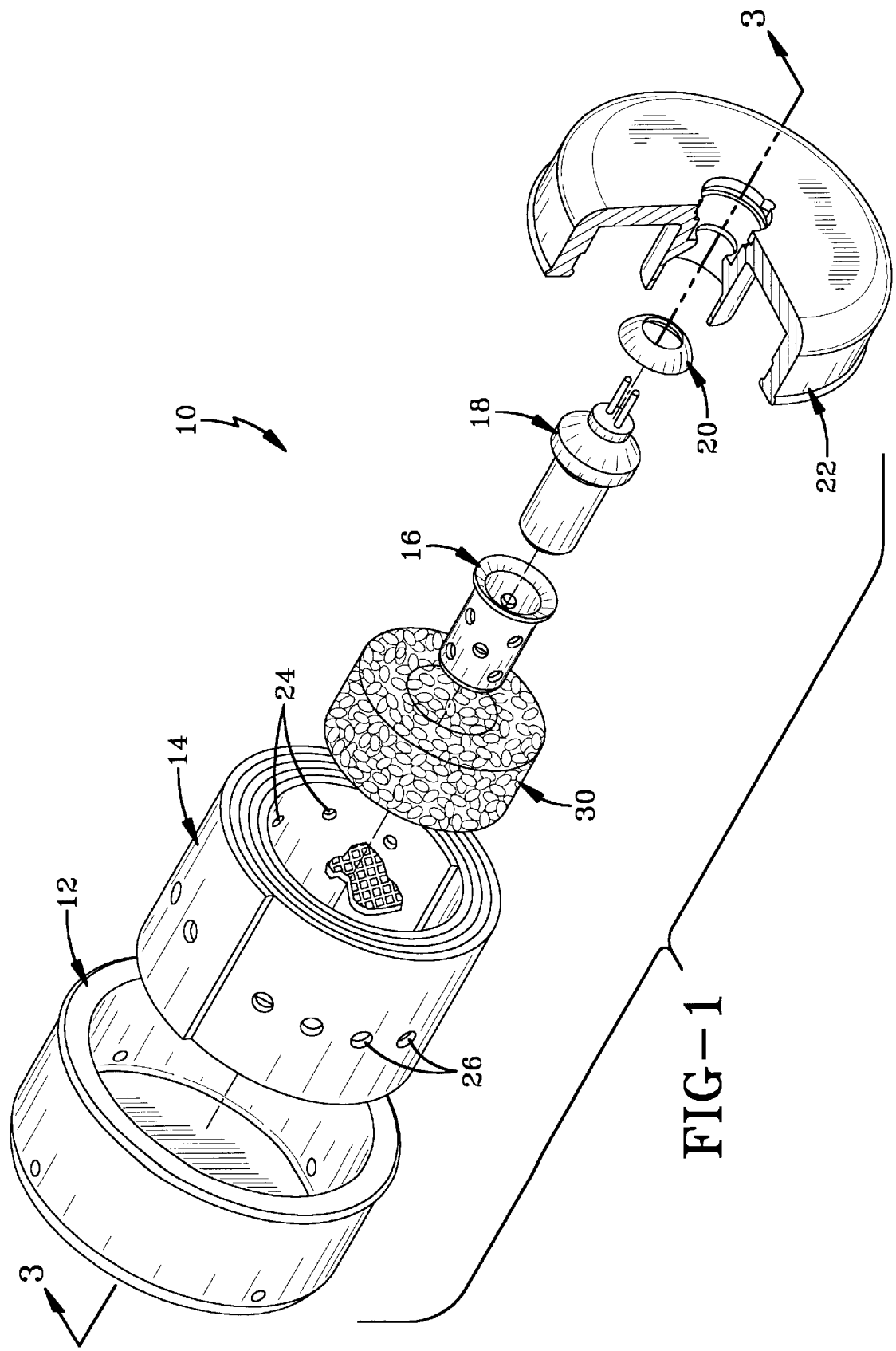
FIG. 1 is an exploded view of an inflator used in the tests described herein and employing the inventive filter system.

The gas generant formulations used in the inflator of this invention are formulated from the guanidine family of fuels such as guanidine nitrate (GN), triaminoguanidine nitrate (TAGN) and the like. The fuel component will typically comprise between about 45 and about 70 weight %, more preferably between 50 and 60 weight %, of the gas generant composition, while the oxidizer system will typically comprise between about 35 and about 50 weight %, more preferably between 40 and 50 weight %, of the gas generant composition. Processing aids, such as silicon dioxide, may also be used in formulating the gas generant pellets. Those skilled in the art understand that depending upon the particular oxidizers and fuels utilized, certain processing aids have beneficial properties over others.

The fuel useful in the gas generant used in the inflator of the present invention is a mixture of at least two guanidine fuels selected from guanidine nitrate (GN), nitroguanidine (NQ), triaminoguanidine nitrate (TAGN), diaminoguanidine nitrate (DAGN) and monoguanidine nitrate (MGN). Guanidine or iminourea ($CH_5N_3$) has the structural formula:

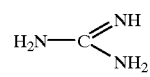

Guanidine is soluble in water and alcohol, volatile and strongly alkaline. It forms many salts, e.g., nitrate and the like. Nitroguanidine is a white crystalline powder which is usually manufactured from calcium carbide via calcium cyanamide, dicyandiamide and guanidine nitrate which is converted to nitroguanidine by action of concentrated sulfuric acid. Nitroguanidine has the structural formula:

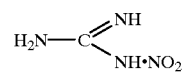

Oxidizers useful in the gas generant compositions used in the inflator of the present invention include ammonium perchlorate and the alkali metal and alkaline earth metal nitrates such as strontium nitrate and sodium nitrate. The preferred oxidizer system is a mixture of strontium nitrate, sodium nitrate and ammonium perchlorate. Ammonium perchlorate is important to the gas generant of the invention due to its gaseous decomposition and lack of particulate production. The potential problem of HCl generation may be overcome through the use of copper chromite and/or iron oxide as a catalyst and/or the sodium from the sodium nitrate. One aspect of the invention is the discovery that AP, which is a component that the industry has a propensity to avoid due to HCl generation, is useful in the inventive gas generants. As set forth in the Examples, the gas generants of the invention produce barely detectable levels of chloride containing gases.

The ratio of oxidizer to fuel in the inventive gas generant is adjusted such that the amount of oxygen allowed in the equilibrium exhaust gases is from zero to 2 or 3% by volume, and more preferably from zero to 2.0% by volume.

The gas generant composition may optionally contain up to about 1.0 weight %, typically between about 0.1 and about 0.3 weight %, of iron oxide, copper chromite or mixtures thereof as catalysts. Copper chromite (CuCr) has known properties as a catalyst. It is a mixed oxide of copper and chromium obtained by igniting copper ammonium chromate under controlled conditions. Barium is frequently added to prevent poisoning of the catalyst, however, the CuCr used in the present invention is preferably free of barium. Copper chromite is principally used for the reduction of carboxyl groups (e.g., ketones to alcohols, and esters to alcohols). The preferred level of copper chromite in the inventive composition is about 0.25 weight %. The iron oxide ($Fe_2O_3$) useful in the inventive compositions may be obtained by all the usual methods. The particle size of the iron oxide and CuCr may vary from about 1 to 10 microns.

The invention will now be described in greater detail by way of specific examples.

Referring to FIG. 1, there is represented in exploded view, an inflator 10 employed in testing several of the gas generant compositions disclosed herein. A first housing member 12 and a second housing member 22 are attached to one another through "friction or inertia welding". The inflator 10 also comprises an inventive strip filter 14, an enhancer tube 16, a squib with enhancer cup 18 and a room temperature vulcanizing rubber seal 20. A bed of gas generant pellets 30 is disposed between the strip filter 14 and the enhancer tube 16. Metal foil, not shown, lines the annular surface of the first housing 12 covering gas exit portals 34 in the first housing.

Figure 2A:
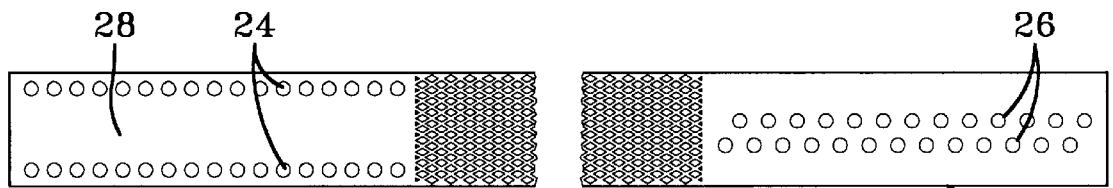
FIG. 2A is a top plan view of one embodiment of the metallic ribbon used to prepare the filter coil according to the invention.
Figure 2B:
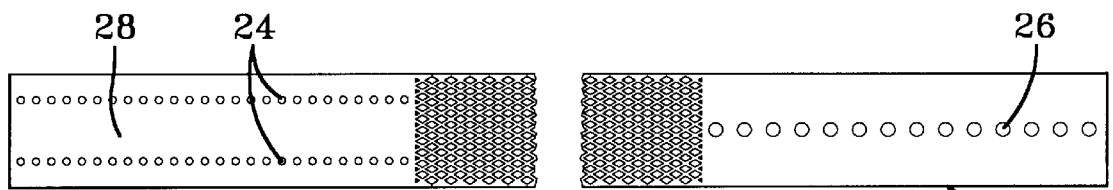
FIG. 2B is a top plan view of a second embodiment of the metallic ribbon.

With reference to FIGS. 2A and 2B, there is represented two (2) embodiments of the inventive filter strip 14. Both embodiments of the filter strip contain at least three (3) segments wherein the first segment 28 (a.k.a. the inside portion) has two (2) rows of apertures therethrough positioned along each edge of the ribbon, an expanded metal segment 29 and second segment 15 wherein at least one row of apertures are present. FIG. 2A is an embodiment wherein the second segment 15 has two (2) rows of a plurality of apertures 26 therethrough with diameter of about 2.0 mm. FIG. 2B represents a second embodiment where the second segment 15 has a single row of apertures 26 therethrough with a diameter of about 4 mm. The placement of the apertures is important for complete combustion of the generant. The first segment, which is adjacent the generant bed, requires apertures along each edges, while the second or final segment must have the aperture in the center of the ribbon. The size and number of the apertures can be varied to control the desired combustion level (i.e., rate of pressure generation). In use, the filter strip is coiled or rolled into a tubular configuration which is placed inside the inflator 10.

The inventors have discovered that a metallic filter strip or ribbon with a combination of segments with holes and a segment of expanded metal can economically produce a filter that effectively cools the gas and removes particulates and slag generated when the gas generant is burned. The metal from which the filter strip 14 is produced can be any metal with a melting point high enough to survive the combustion of the gas generant. The thickness of the strip can range from about 0.25 mm to 1.27 mm with about 0.51 mm to 0.76 mm being more preferred, about 0.63 mm being the most preferred.

The length and height of the strip can vary widely depending upon the size and configuration of the inflator housing into which it is placed. Dependent on the size of the housing, the filter strip is designed such that first segment 28 will complete the first turn during the formation of the coil and the expanded metal segment 29 will complete at least two (2) turns of the coil. Preferably, the expanded metal segment 29 will complete at least three (3) turns. The second segment 15 is of such length that it will completely circumferentially cover the outside of the coil.

Another important aspect of the filter strip is that apertures 24 in the first segment 28 are not aligned with, and do not overlay, the apertures 26 in the second segment 15. In the embodiment set forth in FIG. 2A, the apertures 24 are disposed towards the outside edge of segment 28 while the apertures 26 in the second segment 15 are disposed towards the interior. This aspect is important as it aids in creating a tortuous path for the gases. Further, the use of the expanded metal segment provides a large surface area for the capture of particulates and cooling of the gas and also creates a tortuous path for the gases.

As mentioned previously, the expanded metal segment 29 should be long enough to accomplish at least two (2) turns during the formation of the coil. The diamond shaped openings in the expanded metal segment 29 should have a dimension of about 0.04 to 0.12 mm by 0.32 to 0.8 mm. The expanded metal strip can be made by die cut stamping and the apertures can be drilled or stamped out.

Figure 3:
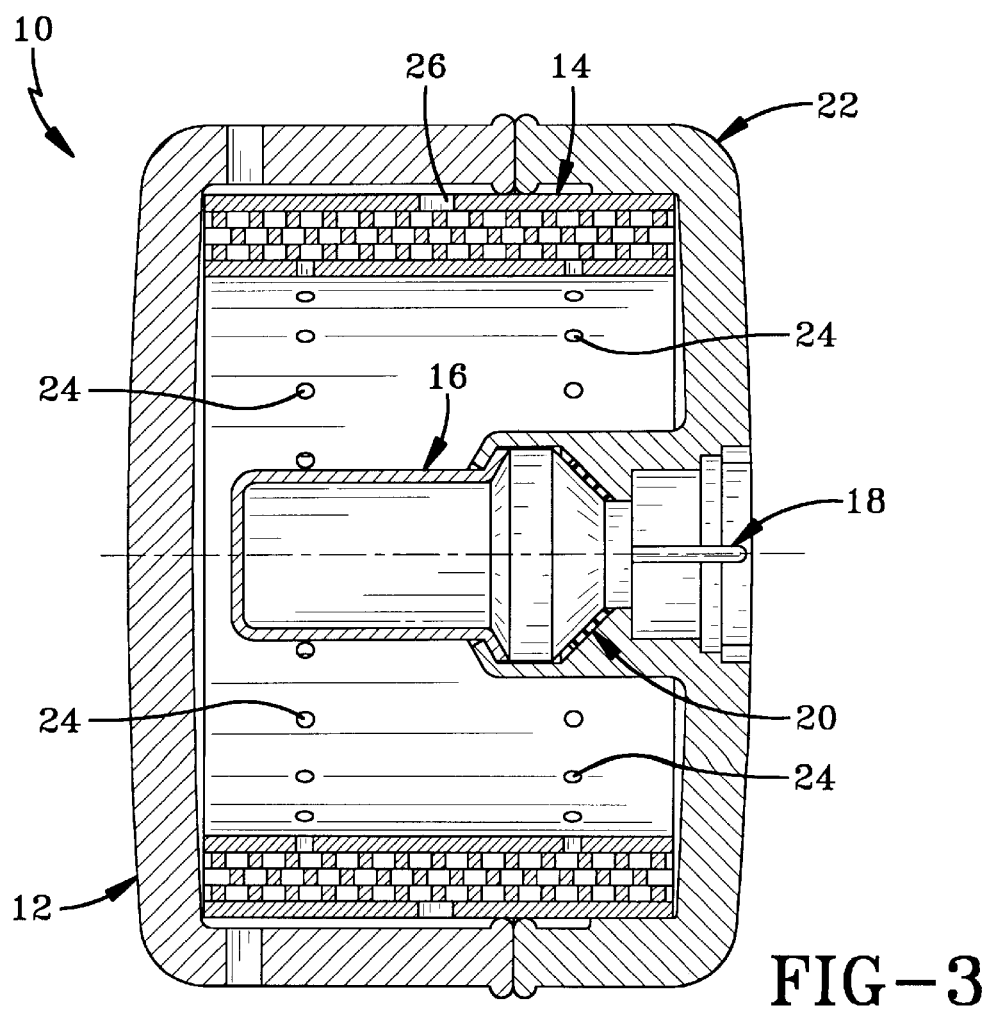
FIG. 3 is a side view in cross section of the inflator taken along line 3—3 of FIG. 1.

FIG. 3 is a cross section of an inflator housing taken along line 3—3 of FIG. 1 except that the squib with enhancer cup 18 is not shown in cross section. The bed of gas generant 36 is not shown for clarity. The inflator housing 10 comprises a first housing member 12 and a second housing member 22 that, in this representative embodiment, are attached by a spin weld 32. Other forms of attachment such as threaded engagement, laser welds and mechanical fixation, are within the scope of the invention. The filtration strip 14 in coiled configuration, is shown as having five (5) turns in FIG. 1. The apertures 24 through the first segment 28 can be in other arrangements than shown, i.e., in a random pattern, provided the apertures 24 are not directly across from the apertures 26 through the second segment. This is required so that the combustion gas must take a tortuous path through the expanded metal to the apertures 26 and then through the exit portals 34.

One additional aspect of the invention is that through subtle changes in the levels of the various components, the combustion temperature and igniting behavior of the generant can be modified to function in a variety of inflator configurations. As those skilled in the art will appreciate, changing the combustion level and temperature will change the CO and $NO_x$ content of the combustion gas as well as output. As an example, reduction of the combustion temperature by using a coolant, on the one hand, gives disadvantages relating to CO and $NO_x$ content as well as output levels. On the other hand, at high output temperature, it leads to potential disadvantages with respect to damage to the airbag. Gas generant development should be understood to be a task of balancing contradicting properties in order to fulfill very special requirements.

In addition, it should be considered that reaction behavior of a gas generant, in areas other than basic chemistry, depends on igniting behavior, combustion surface area and design of the inflator housing which influences pressure build-up. Lastly, the design of the inflator housing can influence the properties of the gas generated through pressure build up as a result of filtering capabilities.

EXAMPLE I

Preparation of Gas Generant

A one Kg batch of a gas generant composition was formulated according to Table I below. The compositions were prepared by grinding the individual components (when needed, i.e., NaN) to a particle size of less than 100 microns and then all of the components of the generant were sifted and then blended in a Turbula® mixer (manufactured by W.A.B. of Switzerland). Mixing continued for one (1) hour.

TABLE I

| | | | Values in Weight % | | | | | |
|---|---|---|---|---|---|---|---|---|
| Sample No | Nitro-guanidine | Guanidine nitrate | Strontium nitrate | Ammonium perchlorate | Sodium nitrate | Nitro-cellulose | DPA* | CuCr |
| 1 | 15 | 40 | 10 | 22 | 11 | 2 | 0.1 | — |
| 2 | 15 | 40 | 10 | 22 | 11 | 2 | — | — |
| 3 | 15 | 42 | 10 | 22 | 11 | — | — | — |
| 4 | 15 | 41.5 | 10 | 22 | 11 | — | — | 0.5 |
| 5 | 15.5 | 41.5 | 8.8 | 22.8 | 11.4 | — | — | 0.25 |
| 6 | 13.5 | 44 | 9 | 22 | 11 | — | — | 0.5 |
| 7 | 15 | 40 | 10 | 22 | 11 | 2 | 0.1 | 0.25 |

*DPA diphenylamine

The material was then pelletized with a rotary pellet press. The pellets were about 5 mm in diameter, 1.8 mm high, weighed about 55 to 65 mg each and had a density of about 1.6 to 1.7 g/cm$^3$.

The formed pellets were then loaded into steel inflators of the type shown in FIG. 1. Either about 19 or 23 gms of the pellets were loaded into each of the steel housings. The 19 gm charge of generant was for a 40 liter airbag while the 23 gm charge was for a 60 liter airbag. The burst foil or tape comprises a thin sheet (about 0.005 mm. thick) of stainless steel with an adhesive on one side. The adhesive side of the burst foil is placed against the inside surface of the inflator housing so as to hermetically seal all of the apertures 34. The apertures 34 are exhaust ports for the gases generated by the generant and were about 2.4 mm in diameter for the 40 liter airbag and about 2.5 mm for the 60 liter airbag. The number of apertures 34 was four. The test inflator housing had a total volume of about 88 cm$^3$, while the region of the housing located inwardly of the filter and containing the pellets of gas generating material had a volume of about 46 cm$^3$ for the 40 liter airbag and about 46 cm$^3$ for the 60 liter airbag. The inflator also incorporated about 0.9 g of BKNO$_3$ (a mixture of boron nitrate and potassium nitrate, conventionally used in the industry), as an enhancer and was associated with the squib with enhancer cup 18.

EXAMPLE II

Testing of the Gas Generant

Two (2) assembled inflators containing 19 gms of the inventive gas generant pellets (Sample No. 5) were evaluated in a (100 cubic foot) test chamber fitted with equipment to record the pressure and time profile of the combustion and to analyze the gases exiting the inflator. The amount of particulate or slag produced by the burning generant was also determined using standardized techniques. The inflators were installed into the test chamber and the gas generant pellets were ignited. The temperature of the inflator at firing was about 23° C.±2° C. at a relative humidity of about 43%. Immediately after firing of the inflator, gas samples were withdrawn from the test chamber for analysis by FTIR (Fourier Transform Infrared Spectroscopy).

Airborne particulate production was measured by filtering post ignition air from the test chamber through a fine filter and measuring the weight gained by the filter. The average total airborne particulate mass for the two (2) tests was 6.85 mg. The average total particulate concentration for the two (2) tests was 68.5 mg/m$^3$.

Gaseous Reaction Products

The test chamber was attached to a vacuum pump, a bubble flow meter, filters and a FT/IR gas analyzer (spectrophotometer). Gas samples were analyzed using an FTIR spectrometer at zero time (before deployment) and at 1, 5, 10, 15 and 20 minute intervals after ignition or via gas chromatography.

The ammonia, benzene, carbon dioxide, formaldehyde, hydrogen chloride, hydrogen cyanide, methane, sulfur dioxide, carbon monoxide (CO), nitric oxide (NO) and nitrogen dioxide (NO$_2$) and water vapor levels of the gases produced in the 100 cubic foot test chamber for the two test samples are set forth in Table II. Samples were transferred directly to the FTIR gas cell from the 100 cubic foot test chamber via six feet of ¼ inch OD fluoropolymer tubing.

TABLE II

| | Gaseous Effluent Data | | | | | | | | | |
|---|---|---|---|---|---|---|---|---|---|---|
| | Ammonia | Benzene | Chloride | Carbon Dioxide | Carbon Monoxide | Formal-dehyde | Hydrogen Chloride | Hydrogen cyanide | Methane | Nitric Oxide |
| Analysis Method | FTIR | FTIR | Tube | FTIR | FTIR | FTIR | FTIR | FTIR | FTIR | FTIR |
| Detection Limit (ppm) | 5 | 5 | 0.2 | 50 | 10 | 2 | 2 | 2 | 5 | 2 |

TABLE II-continued

Gaseous Effluent Data

| | | | | | | | | | | | |
|---|---|---|---|---|---|---|---|---|---|---|---|
| Analysis Delay (min) | | 0.2 | 0.2 | 30 | 0.2 | 0.2 | 0.2 | 0.2 | 0.2 | 0.2 | 0.2 |
| Sample No. 5 (Test I) | 1 | <5 | <5 | * | 995 | 142 | <2 | <2 | 12 | 19 | 28 |
| | 5 | <5 | <5 | * | 840 | 117 | <2 | <2 | 10 | 16 | 22 |
| | 10 | <5 | <5 | * | 792 | 109 | <2 | <2 | 9 | 14 | 20 |
| | 15 | <5 | <5 | * | 765 | 106 | <2 | <2 | 8 | 14 | 18 |
| | 20 | <5 | <5 | * | 745 | 103 | <2 | <2 | 8 | 13 | 17 |
| | TWA 20 | <5 | <5 | ** | 811 | 113 | <2 | <2 | 9 | 15 | 20 |
| Sample No. 5 (Test II) | 1 | <5 | <5 | * | 805 | 107 | <2 | <2 | 8 | 14 | 25 |
| | 5 | <5 | <5 | * | 863 | 108 | <2 | <2 | 8 | 14 | 24 |
| | 10 | <5 | <5 | <0.2 | 796 | 100 | <2 | <2 | 8 | 12 | 22 |
| | 15 | <5 | <5 | * | 765 | 96 | <2 | <2 | 8 | 12 | 20 |
| | 20 | <5 | <5 | * | 754 | 94 | <2 | <2 | 7 | 12 | 18 |
| | TWA 20 | <5 | <5 | ** | 799 | 101 | <2 | <2 | 8 | 13 | 22 |

| | | Nitrogen dioxide | Phosgene | Sulfur dioxide | Water Vapor |
|---|---|---|---|---|---|
| Analysis Method | | FTIR | Tube | FTIR | FTIR |
| Detection Limit (ppm) | | 0.5 | 0.02 | 5 | 500 |
| Analysis Delay (min) | | 0.2 | 30 | 0.2 | 0.2 |
| Sample No. 5 (Test I) | 1 | <0.5 | * | <5 | 1379 |
| | 5 | 1.1 | * | <5 | 515 |
| | 10 | 1.7 | * | <5 | <500 |
| | 15 | 2 | * | <5 | <500 |
| | 20 | 2.4 | * | <5 | <500 |
| | TWA 20 | 1.6 | ** | <5 | <500 |
| Sample No. 5 (Test II) | 1 | <0.5 | * | <5 | 3159 |
| | 5 | 1.4 | * | <5 | 3337 |
| | 10 | 2 | <0.02 | <5 | 3104 |
| | 15 | 2.7 | * | <5 | 2897 |
| | 20 | 3.1 | * | <5 | 2780 |
| | TWA | 2 | ** | <5 | 3068 |

*Compound was not analyzed at this time interval
**TWA (total weighted average) could not be calculated
+ Gas chromatography tube The results set forth in Table II demonstrate that the gas generants of the present invention produce an acceptable gas for use in vehicle occupant restraint systems. The gas generants of the present invention produce a reasonably clean combustion gas and the pellets of the generant also resist degradation due to moisture and thermal cycling.

Both firings of the inflator demonstrated acceptable bag inflation, peak bag pressure and sustained bag pressure and thus would be useful in a vehicle airbag occupant safety system.

EXAMPLE III

Thermal Stability

To test the thermal stability of the gas generant according to this invention, 1.0 gm of the Sample No. 5 composition from Table I was placed in a petri-dish and then in an oven at 135° C. for two (2) hours. The sample was removed and allowed to cool at room temperature. Inspection of the pellets revealed that no melting of the gas generant composition had occurred and that the pellets were intact and did not evidence any cracking, crumbling or change in shape.

EXAMPLE IV

Termal Stability

In this experiment, 19 gms of Sample No. 5 was placed in an inflator as set forth in Example II. After assembly of the inflator, the unit was placed in an oven at 107° C. for two (2) hours. The inflator was removed from the oven, allowed to cool to room temperature and then fired. The inflator performed similar to the tests set forth in Example II, thus demonstrating the thermal stability of the compositions according to the invention.

EXAMPLE V

Hot Cold Ignition

In this experiment, the ignition characteristics of the gas generant at 90° C., ambient (about 24° C.) and −40° C. was investigated. 19 gms of the generant Sample No. 5 was loaded into the housings. A total of nine (9) inflators were prepared. Three (3) were placed in an oven at 90° C. for two (2) hours and three (3) were placed in a freezer at −40° C. for two (2) hours. Three inflators remained at room temperature. The inflators were fired at their respective soak temperatures in a 60 liter test chamber fitted to measure combustion gases, pressure and particulates. Plots of pressure versus time were recorded. Table III sets forth the maximum chamber pressure, time to maximum pressure and area under the curve for each test.

TABLE III

Tank Pressure for Ambient, 90° C. and −40° C. Tests

| Test | Max. Pressure (psi) | Time to Max Pressure (ms) | Area under the Curve (PSI *ms) |
|---|---|---|---|
| Ambient I | 30.1 | 49.8 | 4672.7 |
| Ambient II | 29.7 | 51.6 | 4615.2 |
| Ambient III | 29.5 | 50.2 | 4561.3 |
| 90° C. I | 33.9 | 40.6 | 5221.7 |
| 90° C. II | 32.9 | 42.2 | 5093.1 |
| 90° C. III | 32.3 | 42.0 | 4979.0 |
| −40° C. I | 26.8 | 57.4 | 4119.4 |
| −40° C. II | 26.8 | 58.8 | 4101.0 |
| −40° C. III | 26.2 | 54.8 | 4012.3 |

The data evidence that the gas generant according to the invention provides satisfactory combustion properties over a wide range of temperatures to properly inflate the airbag.

Total particulate production from each test was also collected. Following venting of the tank to the atmosphere, the interior of the 60 liter test chamber was carefully scrubbed and rinsed with deionized water to measure particulate production. The particulate produced by gas generants comprises a mixture of water soluble and insoluble reaction products. The aqueous mixture of the soluble reaction products and the insoluble dust were analyzed to determine total particulate production. Table IV sets forth the insoluble, soluble and total particulates for each run.

TABLE IV

Particulate Production

| Test | Insoluble Particulates (mg) | Soluble Particulates (mg) | Total (mgs) |
|---|---|---|---|
| Ambient I | 217 | 760 | 977 |
| Ambient II | 128 | 658 | 786 |
| Ambient III | 162 | 727 | 889 |
| 90° C. I | 335 | 1008 | 1343 |
| 90° C. II | 363 | 1041 | 1404 |
| 90° C. III | 180 | 1036 | 1216 |
| −40° C. I | 273 | 819 | 1092 |
| −40° C. II | 319 | 760 | 1079 |
| −40° C. III | 271 | 777 | 1048 |

The data evidence that the gas generant composition used in an inflator according to the invention produces a relatively clean gas upon combustion; that is, from a 19 gm charge of generant, less than 1.5 gms of solids exit the inflator.

Toxicity testing was also conducted on the ambient firings of the generant and the results are set forth in Table V.

TABLE V

Gas Toxicity Testing - PPM

| Test | CO | NO | $NO_2$ | $NH_3$ | $CO_2$ | HCl | $Cl_2$ | $H_2S$ | $COCL_2$ |
|---|---|---|---|---|---|---|---|---|---|
| Ambient I | 3746 | 467 | 214 | <5 | (2.6%) | <5 | <0.2 | <0.2 | <0.02 |
| Ambient II | 3513 | 320 | 325 | <5 | (2.6%) | <5 | <0.2 | <0.2 | <0.02 |
| Ambient III | 3773 | 253 | 391 | <5 | (2.7%) | <5 | <0.2 | <0.2 | <0.02 |

( ) = value may be inaccurate, exceeds highest calibration standard.

These data indicate that the generant according to the invention produces a gas that is relatively non-toxic and would therefore be useful in the inflation of air bags and as fire extinguishers.

From these experiments and others that are being conducted at the time of the filing of this application, it is clear that the gas generant according to the invention is useful for inflating airbags and can also be used as fire extinguishers. The generants of the invention are virtually unaffected by temperature extremes and possess excellent ignition and combustion properties. Surprisingly, the use of ammonium perchlorate (AP) does not cause a chlorine problem in the combustion gas. This is quite an unexpected result to those skilled in the art.

Industrial Applicability

The automobile industry is in search of gas generants that are free of the problems associated with the use of azide gas generants. The industry is also in need of inflators using non-azide based generants. The gas generant compositions used in the inflator of this invention and the process for their manufacture meet these needs. An additional aspect of the invention is directed to a novel filtration system for use in an inflator housing. The unique filtration system comprises the use of a metal ribbon which has two segments which have a plurality of apertures and an additional segment disposed between the apertured segments that is expanded metal. The filtration system according to the invention is low in cost, easily incorporated into the inflator housing and is highly effective in trapping particulates and slag formed during the combustion of the generant and cooling the generated gas.

Although the present invention has been disclosed in connection with a few preferred embodiments thereof, variations and modifications may be chosen by those skilled in the art without departing from the principles of the invention. All of these variations and modifications are considered to be within the spirit and scope of the present invention as disclosed in the foregoing description and defined by the appended claims.

We claim:

1. An inflator for use in inflating an occupant restraint system in response to a vehicle collision signal comprising:
   (a) housing means defining at least one discharge port for directing a gaseous flow from said housing means;
   (b) gas generating means disposed within said housing means;
   (c) an ignition unit; and
   (d) a filter means wherein said filter means is disposed between said discharge port and said gas generating means; said filter means comprises a metallic ribbon with at least one segment of its length having apertures therethrough and at least one segment of its length comprising expanded metal configured into a coil.

2. The inflator according to claim 1 wherein said gas generating means is a gas generant composition comprising: a fuel component which is used at a level between 45 and 70 weight %, which comprises a mixture of at least two fuels selected from the group consisting of guanidine nitrate (GN), nitroguanidine (NQ), triaminoguanidine nitrate (TAGN), diaminoguanidine nitrate (DAGN) and monoguanidine nitrate (MGN); and an oxidizer component which is used at a level of between 25 and 50 weight %, which comprises a mixture of alkali metal nitrates, alkaline earth metal nitrates, and ammonium perchlorate.

3. The inflator according to claim 2 wherein said catalyst is selected from copper chromite, iron oxide and mixtures thereof.

4. The inflator according to claim 3 wherein:
   (a) said fuel component comprises a mixture of NQ and GN;
   (b) said oxidizer component comprises a mixture of strontium nitrate (SN), ammonium perchlorate (AP) and sodium nitrate (NaN); and
   (c) said catalyst is copper chromite (CuCr).

5. The inflator according to claim 4 wherein:
   (a) said NQ is at a concentration of 10–20 weight % and said GN is at a concentration of 35–50 weight %;
   (b) said SN is at a concentration of 5–15 weight %;
   (c) said AP is at a concentration of 15–25 weight %; said NaN is at a concentration of 5–25 weight %; and
   (d) said copper chromite is at a concentration of 0.1–0.5 weight %.

6. The inflator according to claim 5 wherein:
   (a) said NQ is at a concentration of 14–17 weight % and said GN is at a concentration of 40–43 weight %;
   (b) said SN is at a concentration of 7–10 weight %;
   (c) said AP is at a concentration of 21–24 weight %;
   (d) and said NaN is at a concentration of 10–13 weight %; and
   (e) said CuCr is at a concentration of 0.2–0.3 weight %.

7. The inflator according to claim 2 wherein said gas generant composition is prepared by the steps comprising:
   (a) dry blending said fuel component with said oxidizer component until a homogenous blend is achieved;
   (b) adding said catalyst to said homogenous blend and blending until a second homogenous blend is achieved; and
   (d) pelletizing said second homogenous blend to produce pellets of from 5–500 mgs.

8. The inflator according to claim 1 wherein said metallic ribbon comprises a first apertured segment wherein said apertures are at the edges of said ribbon, and a second apertured segment wherein said apertures are centrally located.

* * * * *